(12) United States Patent
Alruwaili et al.

(10) Patent No.: US 11,867,053 B2
(45) Date of Patent: Jan. 9, 2024

(54) SHEAR HEAD DEVICE

(71) Applicants: SAUDI ARABIAN OIL COMPANY, Dhahran (SA); INTEGRITY INSITU, Calgary (CA)

(72) Inventors: Khalid M. Alruwaili, Dammam (SA); Cory Fehr, Calgary (CA)

(73) Assignees: SAUDI ARABIAN OIL COMPANY, Dhahran (SA); INTEGRITY INSITU, Calgary (CA)

( * ) Notice: Subject to any disclaimer, the term of this patent is extended or adjusted under 35 U.S.C. 154(b) by 641 days.

(21) Appl. No.: 17/104,796

(22) Filed: Nov. 25, 2020

(65) Prior Publication Data

US 2022/0163689 A1    May 26, 2022

(51) Int. Cl.
| | |
|---|---|
| *E21B 49/00* | (2006.01) |
| *E21B 47/013* | (2012.01) |
| *G01V 1/153* | (2006.01) |
| *G01V 1/18* | (2006.01) |
| *G01V 1/22* | (2006.01) |

(Continued)

(52) U.S. Cl.
CPC ............ *E21B 49/00* (2013.01); *E21B 47/013* (2020.05); *G01N 3/24* (2013.01); *G01N 3/40* (2013.01); *G01V 1/133* (2013.01); *G01V 1/153* (2013.01); *G01V 1/181* (2013.01); *G01V 1/22* (2013.01); *G01V 1/46* (2013.01); *G01V 1/52* (2013.01);

(Continued)

(58) Field of Classification Search
CPC .............................. E21B 49/00; E21B 47/013
See application file for complete search history.

(56) References Cited

U.S. PATENT DOCUMENTS

| | | | | |
|---|---|---|---|---|
| 5,165,274 A | * | 11/1992 | Thiercelin | E21B 49/006 73/152.59 |
| 6,230,557 B1 | * | 5/2001 | Ciglenec | E21B 49/10 73/152.01 |

(Continued)

FOREIGN PATENT DOCUMENTS

CN          209215143 U          8/2019

OTHER PUBLICATIONS

Boháč, Petr et al., "Acoustic Emission Generated during Scratch Test of Various Films", Journal of Nondestructive Testing, vol. 19, 2016 (8 pages).

(Continued)

*Primary Examiner* — Ryan D Walsh
(74) *Attorney, Agent, or Firm* — Osha Bergman Watanabe & Burton LLP

(57) ABSTRACT

The shear head device includes a monitoring head having geophones and transmitters inside a cylindrical body. A shear head is coupled to the monitoring head from below. The shear head has a tubular structure with a plurality of apertures formed around an outer surface of the tubular structure. A plurality of cones are coupled with modified tips and disposed within the plurality of apertures. A sheet supports the plurality of cones inside the shear head. The sheet is selectively movable between a first radial position and a second radial position for the modified tips to apply radial force to the rock by adjustment of an internal pressure of the shear head. The transmitters transmit the recorded acoustic emission to a computing system for determining properties of the rock while the shear head device is testing the rock in the bore.

20 Claims, 9 Drawing Sheets

(51) Int. Cl.
  *G01V 1/133* (2006.01)
  *G01V 1/52* (2006.01)
  *G01V 1/46* (2006.01)
  *G01N 3/40* (2006.01)
  *G01N 3/24* (2006.01)

(52) U.S. Cl.
  CPC ........... *G01N 2203/0053* (2013.01); *G01N 2203/0076* (2013.01); *G01V 2210/1299* (2013.01)

(56) References Cited

U.S. PATENT DOCUMENTS

| | | | |
|---|---|---|---|
| 8,141,419 B2 | 3/2012 | Tchakarov et al. | |
| 8,171,990 B2* | 5/2012 | Tchakarov | E21B 49/06 73/152.59 |
| 8,511,400 B2* | 8/2013 | Catoi | E21B 47/01 175/45 |
| 9,790,787 B2* | 10/2017 | Parker | G01V 5/12 |
| 10,968,737 B2* | 4/2021 | Marsala | E21B 47/024 |
| 2005/0172702 A1 | 8/2005 | Gitis et al. | |
| 2006/0076161 A1 | 4/2006 | Weaver et al. | |
| 2009/0260415 A1 | 10/2009 | Suarez-Rivera et al. | |
| 2011/0066390 A1 | 3/2011 | Macleod et al. | |
| 2011/0286304 A1 | 11/2011 | Thigpen et al. | |
| 2013/0075161 A1 | 3/2013 | Yang | |
| 2015/0068292 A1 | 3/2015 | Su et al. | |
| 2015/0136388 A1 | 5/2015 | Fehr | |
| 2016/0177709 A1 | 6/2016 | Li et al. | |
| 2018/0171772 A1 | 6/2018 | Rodney | |
| 2019/0153859 A1 | 5/2019 | Neale et al. | |
| 2019/0234204 A1 | 8/2019 | Moronkeji et al. | |

OTHER PUBLICATIONS

Adachi, José I et al., "Determination of rock strength parameters from cutting tests", Rock Mechanics Tools and Techniques, Eds. Michel Aubertin et al., A.A. Balkema, vol. 2, 1996, pp. 1517-1523 (7 pages).

Zhang, Hongying et al., "New PDC Bit with Hollowed Cutters: with Increased ROP and Longer Service Life", SPE-197771-MS, Society of Petroleum Engineers, Nov. 2019, pp. 1-8 (8 pages).

Schei, G. et al., "The Scratch Test: An Attractive Technique for Determining Strength and Elastic Properties of Sedimentary Rocks", SPE 63255, Society of Petroleum Engineers, Oct. 2000, pp. 1-7 (7 pages).

International Search Report and Written Opinion issued in Application No. PCT/US2021/060168, dated Mar. 9, 2022 (14 pages).

* cited by examiner

SHEAR HEAD DEVICE

BACKGROUND

In oil fields, drilling operation includes a series of complex operations necessary to construct a wellbore for extraction of natural resources. Drilling efficiency of a bore often depends on the rate of penetration (ROP), which is the rate at which drill bits break rocks in order to deepen a bore. Cuttings are produced as the drill bits break rocks in the bore, and the cuttings need to be transported away from the drill bits in order to enable the drill bits to continue breaking new rocks. For efficient drilling operation, ROP has to be balanced with other aspects of drilling operation. As such, underground formation and properties of rocks in the bore are often required when addressing issues such as reservoir compaction, hydraulic fracturing, borehole stability, and sand production.

SUMMARY

In a first summary example, an apparatus tests a rock in a bore. The apparatus includes a monitoring head having geophones and transmitters inside a cylindrical body and a shear head coupled to the monitoring head from below. The shear head has a tubular structure with a plurality of apertures formed around an outer surface of the tubular structure. A plurality of cones are coupled with modified tips and disposed within the plurality of apertures. A sheet supports the plurality of cones inside the shear head. The sheet is selectively movable between a first radial position and a second radial position for the modified tips to apply radial force to the rock by adjustment of an internal pressure of the shear head. The modified tips are inside the outer surface when the sheet is at the first radial position. The modified tips are in contact with the rock when the sheet is at a third radial position between the first radial position and the second radial position. The modified tips are at a maximum penetration distance in the rock when the sheet is at the second radial position. The geophones record acoustic emission generated between the modified tips and the rock and the transmitters transmit the recorded acoustic emission to a computing system for determining properties of the rock while the apparatus is testing the rock in the bore.

The monitoring head may include an upper end coupled to a lower end of a string for rotating the apparatus at a pre-determined rate and for the modified tips to apply shear force to the rock. The plurality of cones may be hard steel while the modified tips are polycrystalline diamond compact bits having a body resistant to wear damages. The modified tips may include a plurality of different tips for generating acoustic emission in a range of amplitude and frequency used to determine the properties of the rock with accuracy. The plurality of different tips may include one or a combination of a conical cutter, ax-shaped cutter, spherical tip, polygon tip, etc. The properties of the rock may include stiffness, cohesiveness, friction angle, tensile strength, brittleness, and failure resistance of the rock.

In a second summary of example, a system includes a string coupled to an external drive and a computing system. A testing device is coupled to a lower end of the string and disposed in a bore to test rock in the bore. The testing device includes a monitoring head having geophones and transmitters inside a cylindrical body. A shear head is coupled to the monitoring head from below. The shear head has a tubular structure with a plurality of apertures formed around an outer surface of the tubular structure. The plurality of cones are coupled with modified tips and disposed within the plurality of apertures. A sheet supports the plurality of cones inside the shear head. The sheet is selectively movable between a first radial position and a second radial position for the modified tips to apply radial force to the rock by adjustment of an internal pressure of the shear head. The modified tips are inside the outer surface when the sheet is at the first radial position, in contact with the rock when the sheet is at a third radial position between the first radial position and the second radial position. The modified tips are at a maximum penetration distance in the rock when the sheet is at the second radial position. The geophones record acoustic emission generated between the modified tips and the rock. The transmitters transmit the recorded acoustic emission to the computing system for determining properties of the rock while the apparatus is testing the rock in the bore.

The external drive may be configured to rotate the string to rotate the testing device at a pre-determined rate for the modified tips to apply shear force to the rock. The external drive may be configured to move the testing device along the bore to a different location to test different rock.

The modified tips may include a plurality of different tips for generating acoustic emission in a range of amplitude and frequency used to determine the properties of the rock with accuracy. The plurality of different tips may include one or a combination of a conical cutter, ax-shaped cutter, spherical tip, polygon tip, etc. The properties of the rock may include stiffness, cohesiveness, friction angle, tensile strength, brittleness, and failure resistance of the rock.

In a third summary example, a method includes lowering a shear head device coupled to a lower end of a string to test rock in a bore. The method further includes providing a pressurized fluid into the shear head device through a conduit in the string. The pressurized fluid pushes a sheet supporting a plurality of cones outwardly and the modified tips coupled to the plurality of cones contact the rock. The method further includes receiving, from the shear head device, acoustic data of acoustic emission generated between the modified tips and the rock. The method further includes determining properties of the rock using the acoustic data while the shear head device is testing the rock in the bore.

The method may further include rotating the string to rotate the shear head device for the modified tips to apply shear force to the rock. The method may further include rotating the string to rotate the shear head device for the modified tips to move laterally at the maximum penetration distance in the rock. The method may further include moving the shear head device along the bore to test second rock in a different location.

The pressurized fluid may push the sheet to a second radial position defining a maximum penetration distance of the modified tips in the rock, leading to failures of the rock. The acoustic data may be data for a range of amplitude and frequency of acoustic emission generated between the rock and the modified tips having a plurality of different tips. The plurality of different tips may include one or a combination of a conical cutter, ax-shaped cutter, spherical tip, polygon tip, etc. The properties of the rock may include stiffness, cohesiveness, friction angle, tensile strength, brittleness, and failure resistance of the rock.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
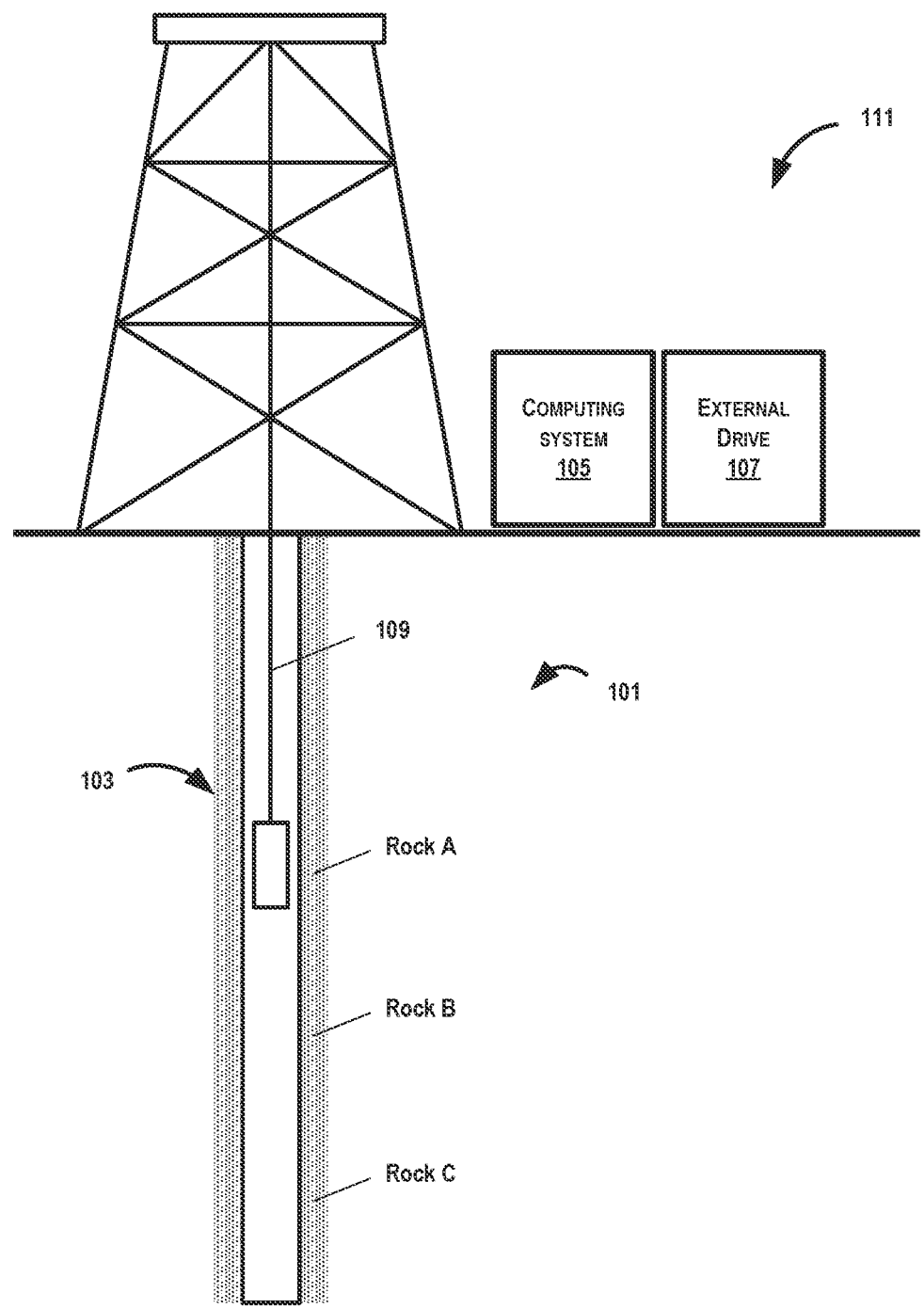
FIG. 1 is a schematic diagram of a system for testing rocks in a bore.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, related well known features or processes have not been shown or described in detail to avoid unnecessarily obscuring the implementations and embodiments. For the sake of continuity, and in the interest of conciseness, same or similar reference characters may be used for same or similar objects in multiple figures.

FIG. 1 shows a system 111 for testing rocks in a bore 101 in accordance with one or more embodiments. A shear head device 103 coupled to a lower end of a work string 109 may be lowered to a desired location along the bore 101 to test rocks A around the desired location. The shear head device 103 at the desired location may interact with rocks A, and the rocks A may be tested by analyzing acoustic signals generated from the interaction between the rocks A and the shear head device 103. An external drive 107 may be used to control the shear head device 103 for the interaction, and the generated acoustic signals may be recorded and transmitted to the computing system 105 for determining properties of the rocks A while the shear head device 103 is testing the rocks A in the bore 101. A method of using the shear head device 103 may include moving the shear head device 103 along the bore 101 to test rocks B, C in a different location.

Figure 2:
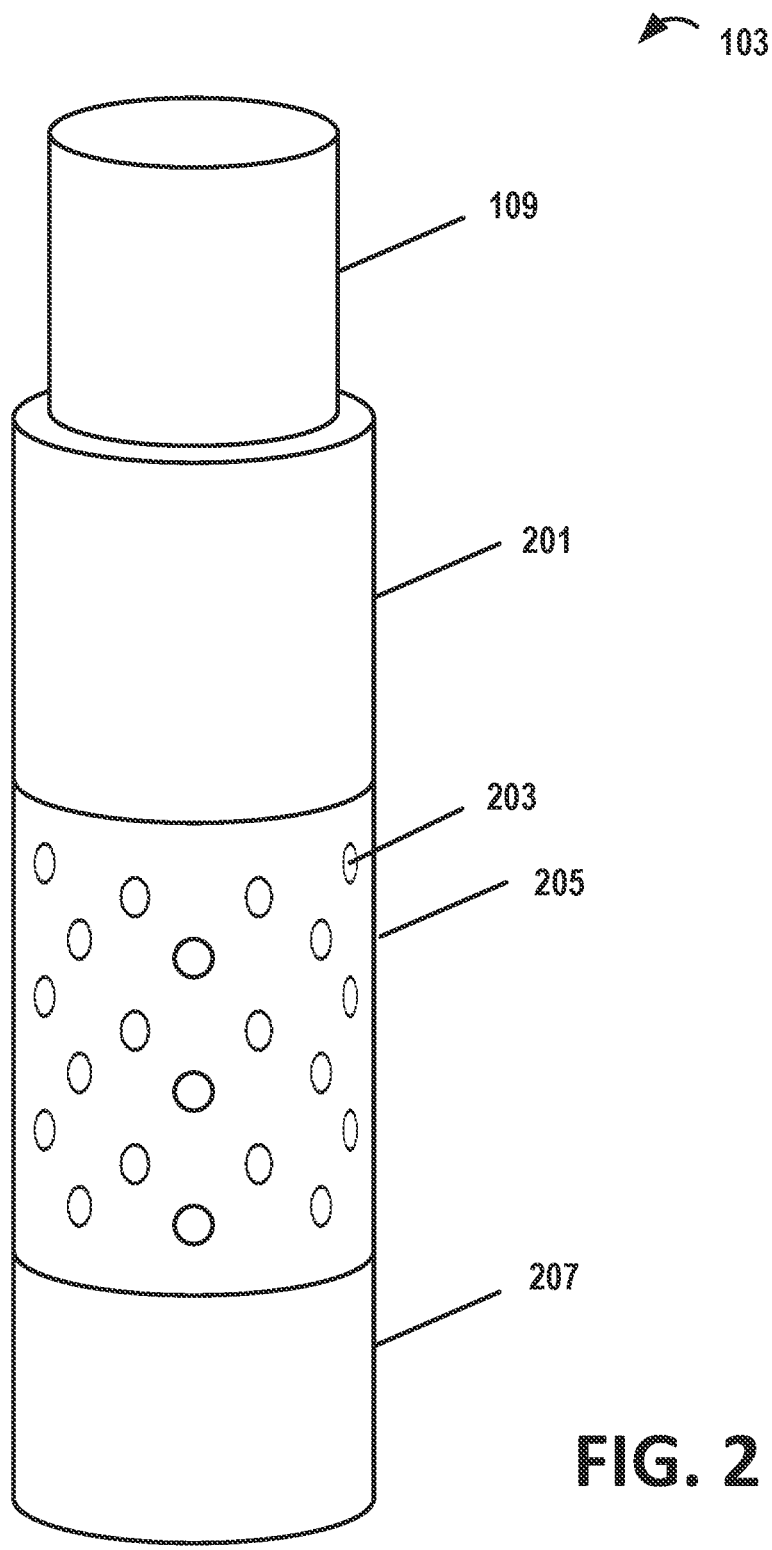
FIG. 2 shows a shear head device in accordance with one or more embodiments.

FIG. 2 shows a shear head device 103 in accordance with one or more embodiments. The shear head device 103 may include a monitoring head 201, a shear head 205, and a base 207 connected together to form a cylindrical body. The base 207 is disposed at the bottom of the shear head device 103 to protect the shear head device 103 from damages that may occur during lowering operation of the shear head device 103 in a bore. The monitoring head 201 may have an upper end for connection with a work string 109 and a lower end for connection with the shear head 205 (e.g., threaded connection). The shear head 205 coupled to the monitoring head 201 from below has a tubular structure with a plurality of apertures 203 formed around an outer surface of the tubular structure. A plurality of cones equipped with modified tips (not shown) may be disposed inside the shear head, and each of the apertures 203 around the outer surface of the shear head 205 provides a passage for a respective cone to move along the apertures 203. When the shear head device 103 is to interact with rocks, the modified tips may selectively move outwardly to interact with the rocks for generating acoustic signals. The monitoring head 201 may include sensors to detect the generated acoustic signals from the rocks, recorders to record the detected acoustic signals, and transmitters to transmit the recorded acoustic signals to the computing system 105 for determining properties of the rocks while the shear head device 103 is interacting with the rocks in the bore.

Figure 3:
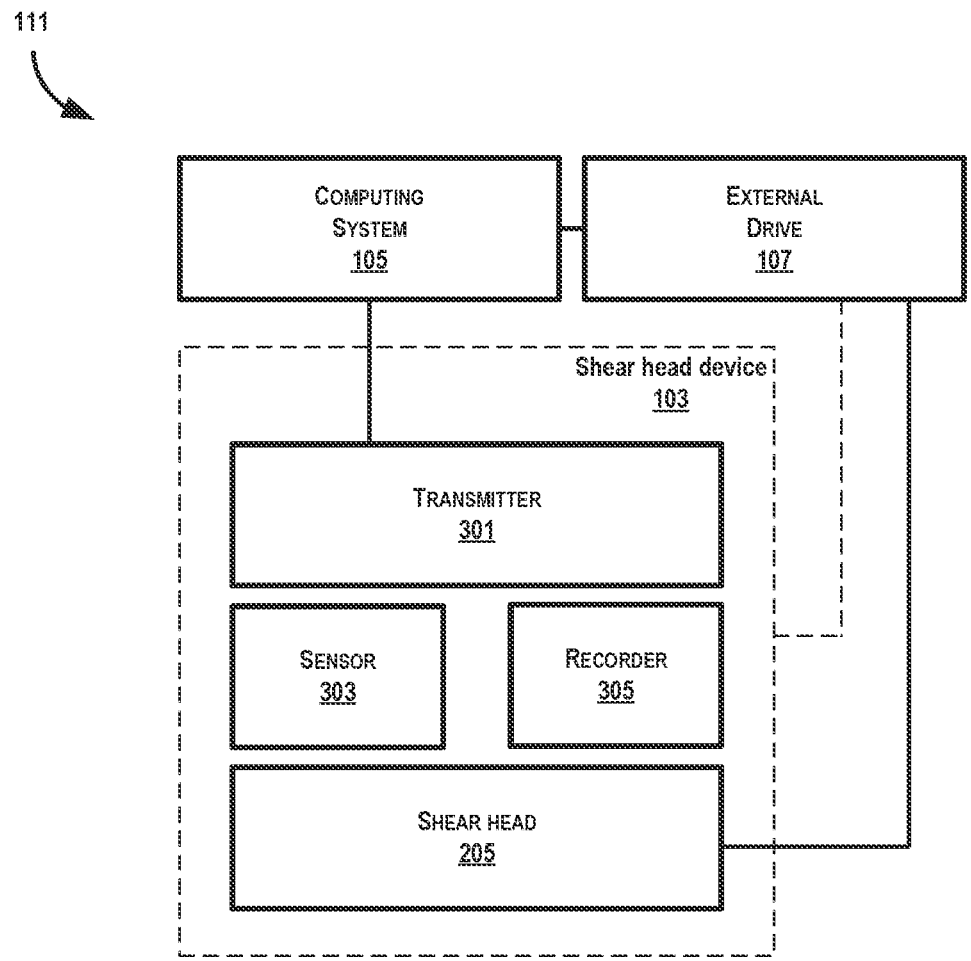
FIG. 3 is a block diagram of the system in FIG. 1.

FIG. 3 shows a block diagram of a system 111 in accordance with one or more embodiments. For interaction between the shear head device 103 and rocks, the external drive 107 may be used to control the shear head 205, which may lead the plurality of cones inside the shear head 205 to protrude outwardly and to intrude into the rocks. The external drive 107 may also be used to rotate the shear head device to scratch the rocks. Such interaction may generate acoustic signals, and sensor 303 may detect the acoustic signals. Sensor 303 may be one or more sensors to record acoustic signals different in amplitude and frequency. The acoustic signals may vary depending on formation type of rocks, shape of the modified tips, and penetration distance of the modified tips into the rocks, which will be explained in more detail. Recorders 305 may record the detected acoustic signals from the sensor 303, and transmitter 301 may transmit the acoustic signals to the computing system 105 for determining properties of the rocks.

Numerous tests in fields and laboratories show that acoustic signals generated from the interaction between the shear head device 103 and rocks may vary in frequency and amplitude depending on formation type of the rocks. For example, ochre, a natural clay, may exhibit a relatively lower sound pressure level compared to coal, when interacted with the shear head device 103. The dominant frequencies of the acoustic signals are also different between the ochre and coal, which provides information to identify type of rocks when the acoustic signals are analyzed.

Figure 9A:
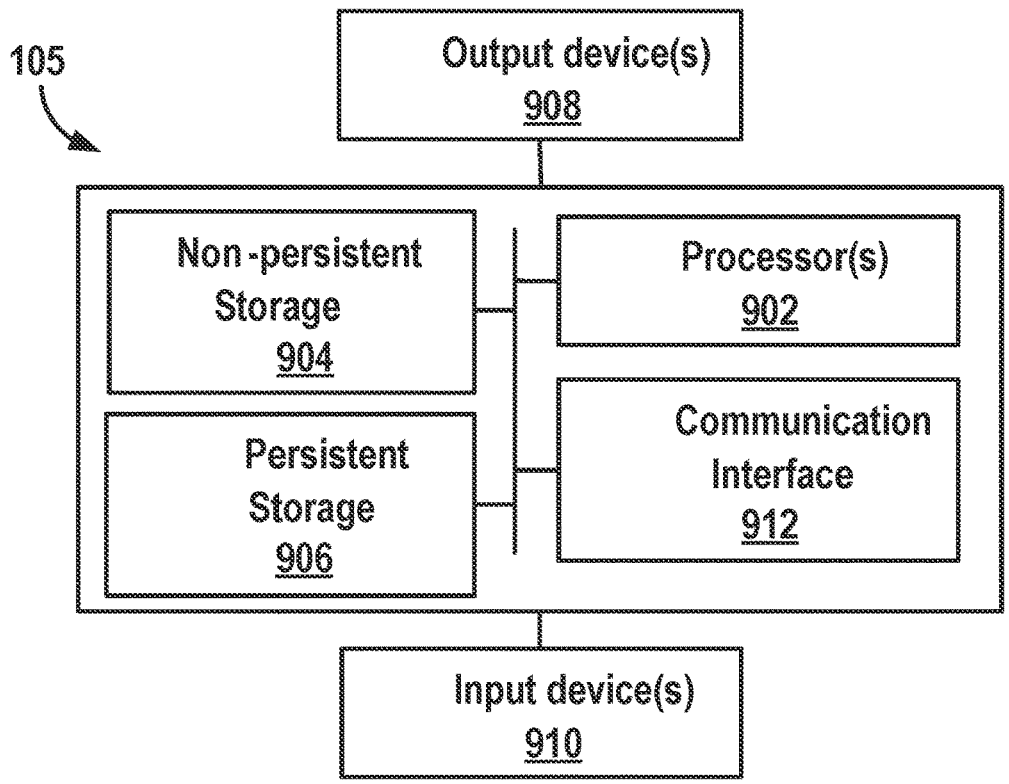
FIG. 9A shows a computing system in accordance with one or more embodiments.

Properties of the rocks including stiffness, cohesiveness, friction angle, tensile strength, brittleness, failure resistance, etc., may be determined using a computing system and a network system while the shear head device is testing the rocks inside a bore. Specifically, any combination of mobile, desktop, server, router, switch, embedded device, or other types of hardware may be used for controlling the shear head device 103 inside a bore while determining properties of the rocks being tested. For example, as shown in FIG. 9A, the computing system 105 may include one or more computer processors 902, non-persistent storage 904 (e.g., volatile memory, such as random access memory (RAM), cache memory), persistent storage 906 (e.g., a hard disk, an optical drive such as a compact disk (CD) drive or digital versatile disk (DVD) drive, a flash memory, etc.), a communication interface 912 (e.g., Bluetooth interface, infrared interface, network interface, optical interface, etc.), output devices 908 and numerous other elements and functionalities.

The computer processor(s) 902 may be an integrated circuit for processing instructions. For example, the computer processor(s) may be one or more cores or micro-cores of a processor. The computing system 105 may also include one or more input devices 910, such as a touchscreen, keyboard, mouse, microphone, touchpad, electronic pen, or any other type of input device.

The communication interface 912 may include an integrated circuit for connecting the computing system 105 to a network (not shown) (e.g., a local area network (LAN), a wide area network (WAN) such as the Internet, mobile network, or any other type of network) and/or to another device, such as another computing device.

Further, the computing system 105 may include one or more output devices(s), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 902, non-persistent storage 904, and persistent storage 906. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 9B:
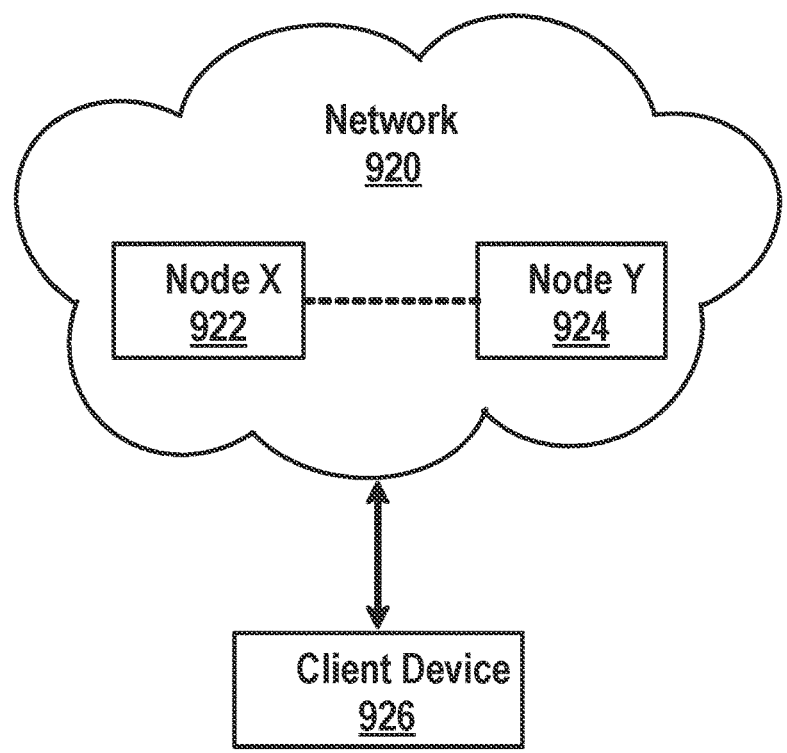
FIG. 9B shows a network system in accordance with one or more embodiments.

The computing system 105 in FIG. 9A may be connected to or be a part of a network. For example, as shown in FIG. 9B, the network 920 may include multiple nodes (e.g., node X 922, node Y 924). Each node may correspond to a computing system, such as the computing system shown in FIG. 9A, or a group of nodes combined may correspond to the computing system shown in FIG. 9A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 105 may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 922, node Y 924) in the network 920 may be configured to provide services for a client device 926. For example, the nodes may be part of a cloud computing system. The nodes may include functionality to receive requests from the client device 926 and transmit responses to the client device 926. The client device 926 may be a computing system, such as the computing system 105 shown in FIG. 9A. Such network connection allows operators to determine properties of rocks that are located in different bores while using the same computing system 105.

Figure 4A:
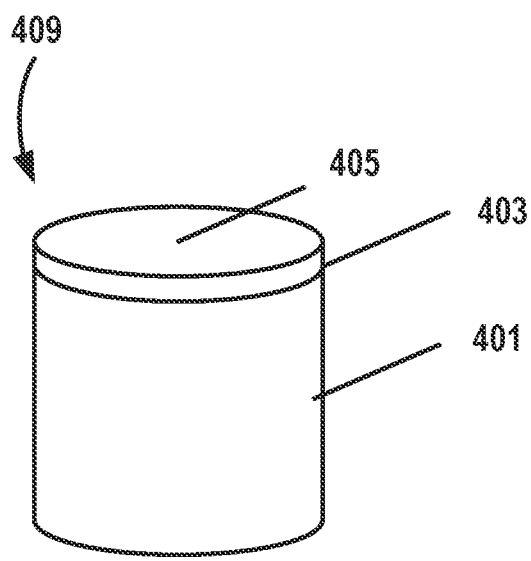
FIGS. 4A, 4B, 4C, and 4D show a modified tip in accordance with one or more embodiments.
Figure 4B:
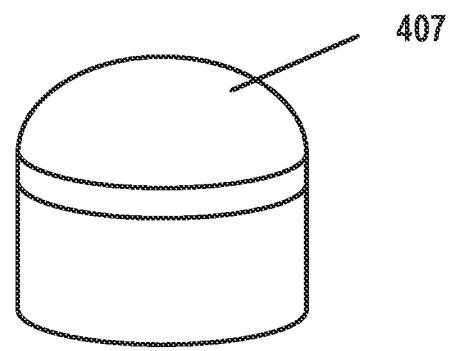
Figure 4C:
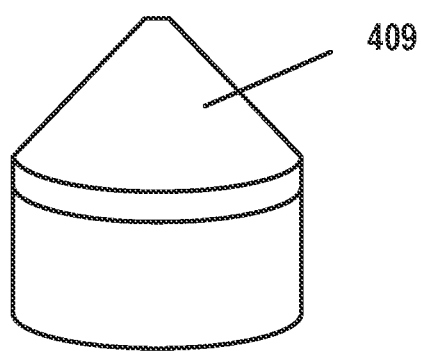
Figure 4D:
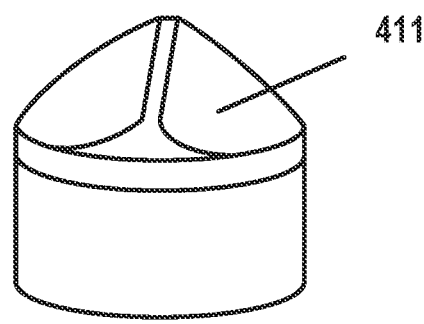
Figure 5:
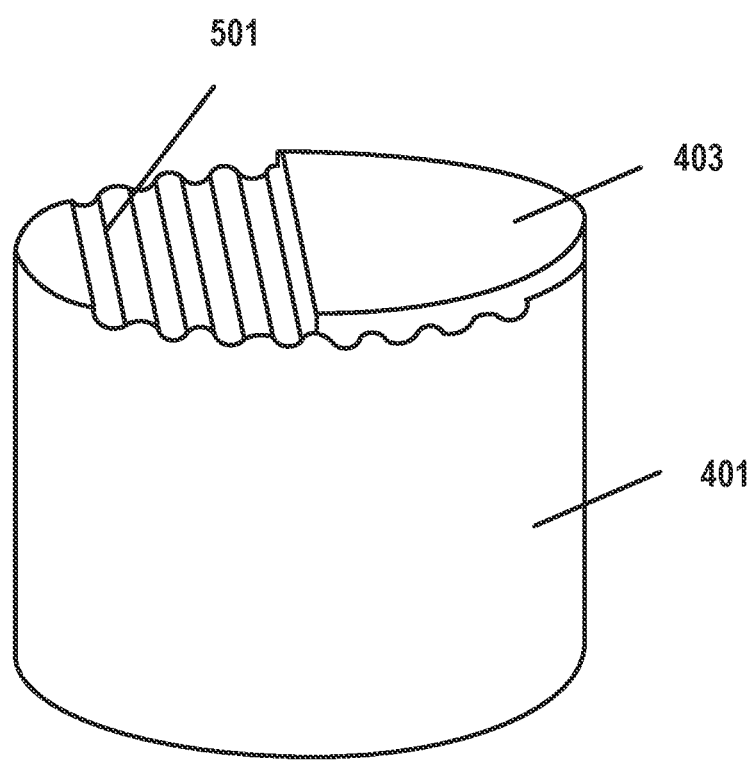
FIG. 5 shows an exploded view of a modified tip in accordance with one or more embodiments.

FIGS. 4A to 4D show a modified tip 409 in accordance with one or more embodiments. The modified tip 409 may include a diamond table 403 coupled to a substrate 401 having a cylindrical body of a diameter between 6 and 22 mm. The substrate 401 may be a composite material made up of tungsten carbide grains bonded by metallic binder, which bonds efficiently with diamond tables 403 while impeding erosive damage to the modified tips 409. The interface 501 between the diamond table 403 and the substrate 401 may be non-planar, as shown in FIG. 5 in which the non-planar interface 501 ensures an increased contact area between the substrate 401 and the diamond table 403, thereby improving the bonds and reducing the stress level at the interface 501. One skilled in the art would appreciate how such configuration of the modified tips improves resistance to chipping, spalling, and diamond table delamination.

The modified tip 409 may include a cutting face 405 various in shape and size in accordance with one or more embodiments. For example, FIG. 4A shows a flat cutting face 405 while other embodiments may include a spherical cutting face 407 in FIG. 4B, a conical cutting face 409 in FIG. 4C, and an axe-shaped cutting face 411 in FIG. 4D. Such geometries of the modified tips improve penetration in the rocks that may have different formation and properties depending on the location along the bore. Further, modified tips 409 with different cutting face may generate different acoustic signals when interacting with rocks. For example, a blunt tip, such as a spherical tip, may generate acoustic signals in relatively low frequency range while a sharp tip, such as a triangular tip, may generate acoustic signals in a higher range compared to the acoustic signals generated by the blunt tip. In order to generate acoustic signals that vary widely in frequency and amplitude, the plurality of cones may include modified tips 409 with differently shaped cutting face 405. This allows a relatively large amount of acoustic signal data to be obtained for the same rocks being tested. One skilled in the art would readily appreciate how the plurality of cones having different tips generate acoustic signals in wide range of frequency and amplitude, thereby providing higher accuracy in the analysis of the rocks.

Other embodiments of the modified tips 409 may include more than one diamond table 403, in which a primary diamond table, which is in contact with the substrate, may have an interface to reduce stress. A secondary diamond table is located in the high-abrasion area on the contact side of the modified tips. Such configuration of the modified tips may protect the substrate from abrasion without compromising structural capability of the substrate to support the diamond table. The cones are made of hard steel while the diamond tables are polycrystalline diamond, and other materials may be envisioned depending on types of the rocks. The diamond table 403 may range in thickness from 2 mm to 4 mm, and may have a slight bevel that reduces stress on the modified tips 409 as it makes an initial contact with the rocks.

Figure 6:
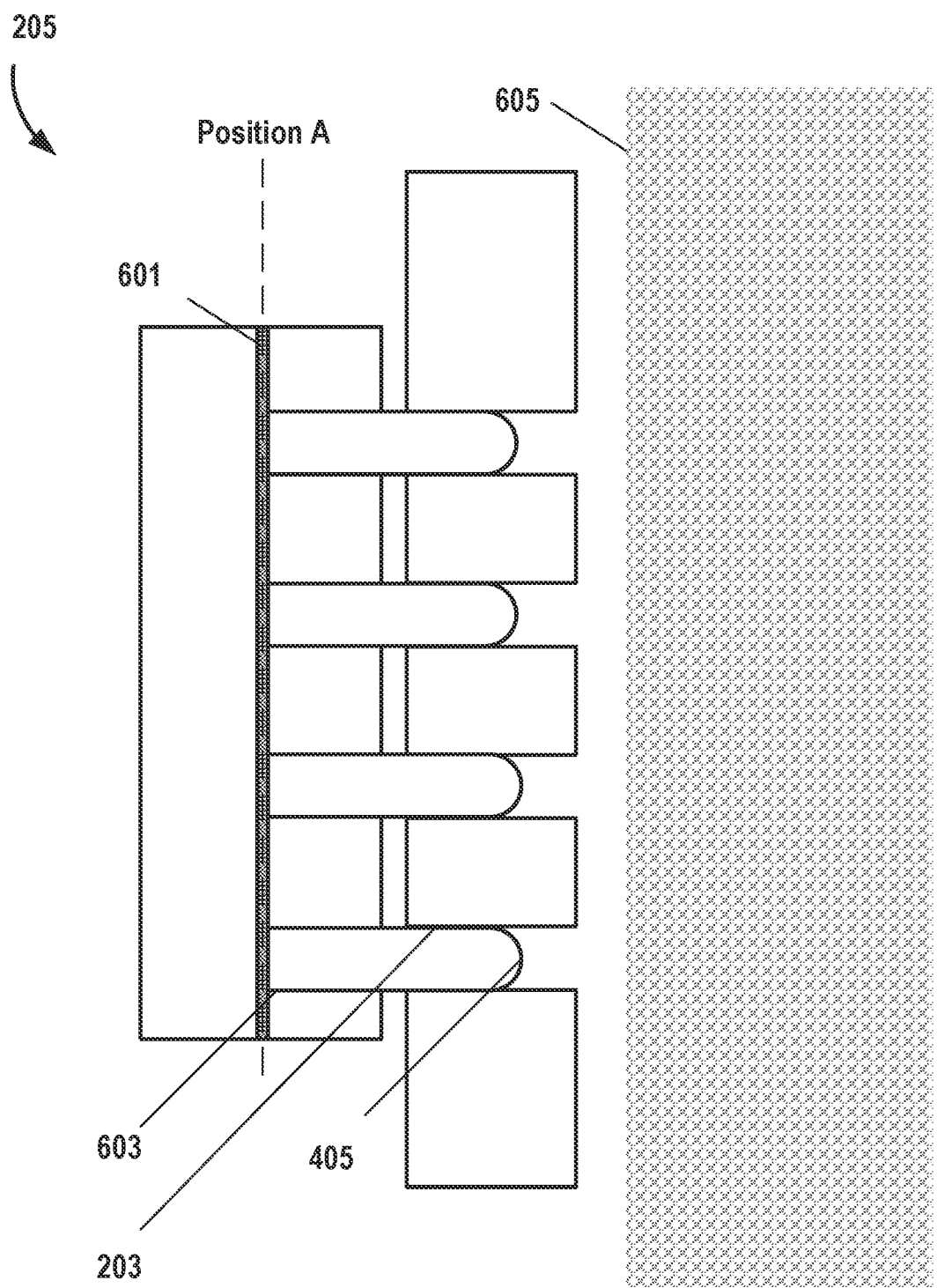
FIG. 6 illustrates a shear head testing rocks in accordance with one or more embodiments.
Figure 7:
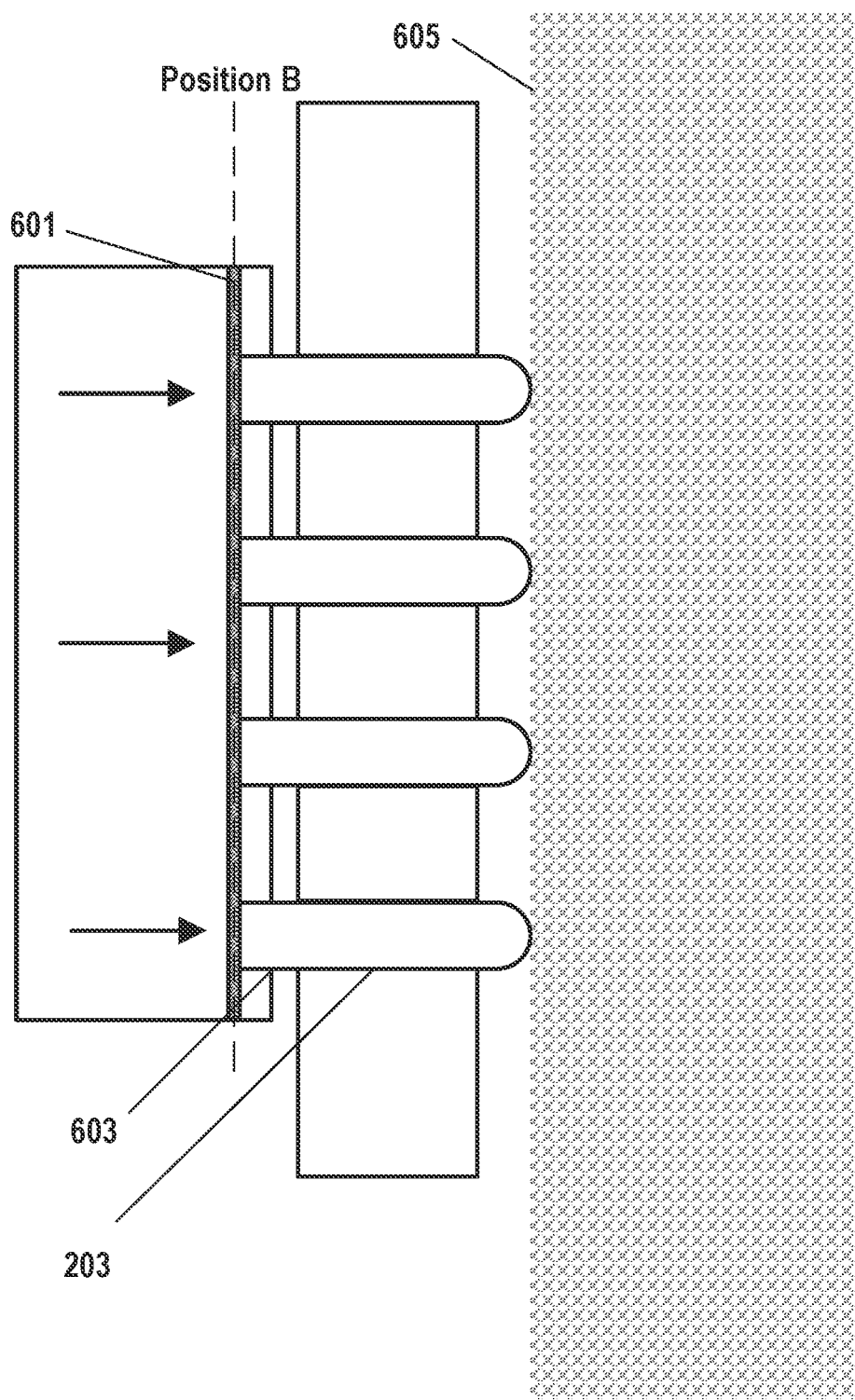
FIG. 7 illustrates a shear head testing rocks in accordance with one or more embodiments.

FIG. 6 shows a sheet 601 supporting a plurality of cones 603 in accordance with one or more embodiments. The plurality of cones 603 within the apertures 203 may be selectively moved, for example, by adjusting the internal pressure of the shear head 205. Specifically, the adjustment of the internal pressure may selectively move the sheet 601 between a radial position A and a radial position C in FIG. 8. The radial position A may be defined at a normal state of the shear head 205 in which the modified tips 409 are disposed inside the outer surface of the shear head 205. As the internal pressure increases, the sheet 601 pushes the plurality of cones 603 outwardly, such as illustrated in FIG. 7, and the modified tips 409 contact the rocks 605 when the sheet 601 is at a radial position B. At such moment, the adjustment of the internal pressure allows the modified tips 409 on the plurality of cones 603 to apply radial force to the rocks 605. A method of using the shear head device 103 may include rotating the shear head device 103 to apply shear force in which the modified tips 409 scratch inner surface of the bore 101 and generate acoustic signals.

Figure 8:
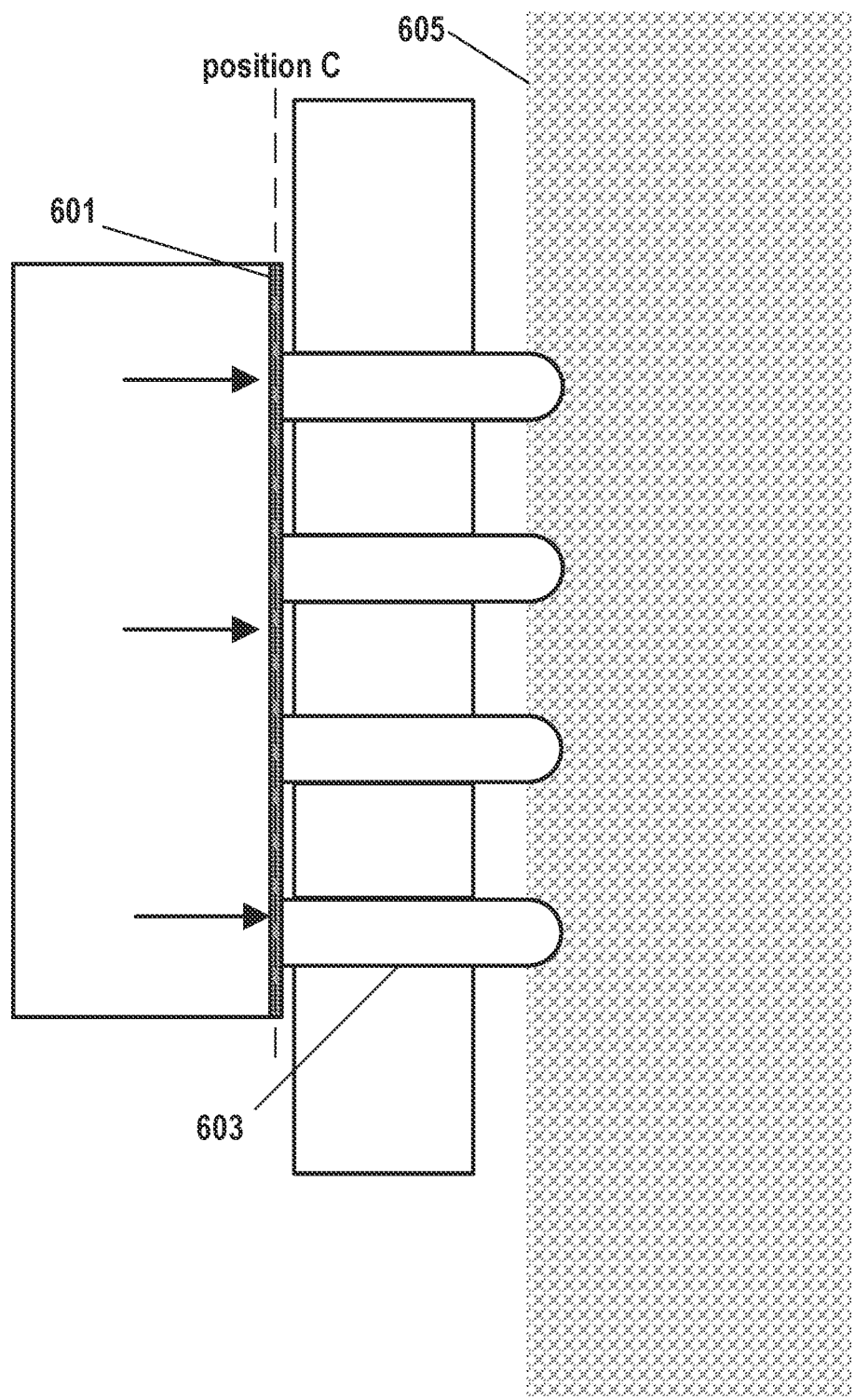
FIG. 8 illustrates a shear head testing rocks in accordance with one or more embodiments.

FIG. 8 shows the sheet 601 supporting the plurality of cones 603 at the radial position C. The modified tips 409 are at a max penetration distance when the sheet 601 is at the radial position C. Lab testing also suggests that frequency and amplitude of the acoustic signals generated from the interaction between the shear head 103 and rocks 605 may vary depending on the penetration distance of the modified tips 409 into the rocks 605. For example, the acoustic signals generated from the interaction at the radial position C may be different from the acoustic signals generated at the radial position B. One skilled in the art would readily appreciate how the acoustic signals obtained at both radial positions B and C improve accuracy in analysis of the rocks 605 being tested.

A method may include lowering a shear head device coupled to a lower end of a work string to a location in a bore to test rocks around the bore. The method may further include providing a pressurized fluid into the shear head device. The pressurized fluid pushes a sheet supporting a plurality of cones outwardly and modified tips coupled to the plurality of cones contact the rock. The method may further include receiving, from the shear head device, acoustic data of acoustic signals generated due to interaction between the modified tips and the rocks. The method may further include determining properties of the rocks using the acoustic data while the shear head device is testing the rock in the bore.

The method may further include rotating the work string to rotate the shear head device in the bore while the modified tips are in contact with the rocks, thereby applying shear force to the rocks. The rotation speed of the shear head device may be adjusted depending on desired shear force to the rocks. The internal pressure of the shear head may also be adjusted for the pressurized fluid to push the sheet to a second radial position which defines a maximum penetration distance of the modified tips in the rock. The maximum penetration leads to failures of the rock, thereby creating acoustic signals that are different from the acoustic signals from the scratching. The method may further include rotating the work string to rotate the shear head device for the modified tips to move laterally at the maximum penetration distance in the rock.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art.

What is claimed is:

1. An apparatus for testing a rock in a bore, the apparatus comprising:
    a monitoring head having geophones and transmitters inside a cylindrical body,
    a shear head coupled to the monitoring head from below, the shear head having a tubular structure with a plurality of apertures formed around an outer surface of the tubular structure,
    a plurality of cones coupled with modified tips and disposed within the plurality of apertures, and
    a sheet supporting the plurality of cones inside the shear head and selectively movable between a first radial position and a second radial position for the modified tips to apply radial force to the rock by adjustment of an internal pressure of the shear head,
    wherein the modified tips are inside the outer surface when the sheet is at the first radial position, in contact with the rock when the sheet is at a third radial position between the first radial position and the second radial position, and at a maximum penetration distance in the rock when the sheet is at the second radial position, and
    wherein the geophones record acoustic emission generated between the modified tips and the rock and the transmitters transmit the recorded acoustic emission to a computing system for determining properties of the rock while the apparatus is testing the rock in the bore.

2. The apparatus according to claim 1, wherein the monitoring head further comprises an upper end coupled to a lower end of a string for rotating the apparatus at a pre-determined rate and for the modified tips to apply shear force to the rock.

3. The apparatus according to claim 1, wherein the plurality of cones are hard steel while the modified tips are polycrystalline diamond compact bits having a body resistant to wear damages.

4. The apparatus according to claim 1, wherein the modified tips comprise a plurality of different tips for generating acoustic emission in a range of amplitude and frequency used to determine the properties of the rock with accuracy.

5. The apparatus according to claim 4, wherein the plurality of different tips include one or a combination of a conical cutter, ax-shaped cutter, spherical tip, polygon tip.

6. The apparatus according to claim 1, wherein the properties of the rock include stiffness, cohesiveness, friction angle, tensile strength, brittleness, and failure resistance of the rock.

7. A system comprising:
    a string coupled to an external drive and a computing system,
    a testing device coupled to a lower end of the string and disposed in a bore to test rock in the bore, the testing device comprising:
        a monitoring head having geophones and transmitters inside a cylindrical body,
        a shear head coupled to the monitoring head from below, the shear head having a tubular structure with a plurality of apertures formed around an outer surface of the tubular structure,
        a plurality of cones coupled with modified tips and disposed within the plurality of apertures, and a sheet supporting the plurality of cones inside the shear head and selectively movable between a first radial position and a second radial position for the modified tips to apply radial force to the rock by adjustment of an internal pressure of the shear head, wherein the modified tips are inside the outer surface when the sheet is at the first radial position, in contact with the rock when the sheet is at a third radial position between the first radial position and the second radial position, and at a maximum penetration distance in the rock when the sheet is at the second radial position, and wherein the geophones record acoustic emission generated between the modified tips and the rock and the transmitters transmit the recorded acoustic emission to the computing system for determining properties of the rock while the apparatus is testing the rock in the bore.

8. The system according to claim 7, wherein the external drive is configured to rotate the string to rotate the testing device at a pre-determined rate for the modified tips to apply shear force to the rock.

9. The system according to claim 7, wherein the modified tips comprise a plurality of different tips for generating acoustic emission in a range of amplitude and frequency used to determine the properties of the rock with accuracy.

10. The system according to claim 9, wherein the plurality of different tips include one or a combination of a conical cutter, ax-shaped cutter, spherical tip, polygon tip, etc.

11. The system according to claim 7, wherein the properties of the rock include stiffness, cohesiveness, friction angle, tensile strength, brittleness, and failure resistance of the rock.

12. The system according to claim 7, wherein the external drive is configured to move the testing device along the bore to a different location to test different rock.

13. A method comprising:
 lowering a shear head device coupled to a lower end of a string to test rock in a bore,
 providing a pressurized fluid into the shear head device through a conduit in the string, wherein the pressurized fluid pushes a sheet supporting a plurality of cones outwardly and modified tips coupled to the plurality of cones contact the rock,
 receiving, from the shear head device, acoustic data of acoustic emission generated between the modified tips and the rock, and
 determining properties of the rock using the acoustic data while the shear head device is testing the rock in the bore.

14. The method according to claim 13, wherein the method further comprises rotating the string to rotate the shear head device for the modified tips to apply shear force to the rock.

15. The method according to claim 13, wherein the pressurized fluid pushes the sheet to a second radial position defining a maximum penetration distance of the modified tips in the rock, leading to failures of the rock.

16. The method according to claim 15 further comprises rotating the string to rotate the shear head device for the modified tips to move laterally at the maximum penetration distance in the rock.

17. The method according to claim 13, wherein the acoustic data is data for a range of amplitude and frequency of acoustic emission generated between the rock and the modified tips having a plurality of different tips.

18. The method according to claim 17, wherein the plurality of different tips include one or a combination of a conical cutter, ax-shaped cutter, spherical tip, polygon tip.

19. The method according to claim 13, wherein the properties of the rock include stiffness, cohesiveness, friction angle, tensile strength, brittleness, and failure resistance of the rock.

20. The method according to claim 13 further comprises moving the shear head device along the bore to test second rock in a different location.

* * * * *